(12) United States Patent
Hinson

(10) Patent No.: US 7,416,233 B2
(45) Date of Patent: Aug. 26, 2008

(54) TANDEM AXLE TRAILER PIN EXTRACTER APPARATUS

(76) Inventor: William G. Hinson, 705 Lakeshore Dr., Eustis, FL (US) 32726

( * ) Notice: Subject to any disclaimer, the term of this patent is extended or adjusted under 35 U.S.C. 154(b) by 0 days.

(21) Appl. No.: 11/657,160

(22) Filed: Jan. 24, 2007

(65) Prior Publication Data

US 2008/0173849 A1 Jul. 24, 2008

(51) Int. Cl.
*B62D 33/08* (2006.01)
(52) U.S. Cl. ...................... 294/26; 280/149.2
(58) Field of Classification Search ............... 294/19.1, 294/24, 26, 17, 18; 29/278; 280/407.1, 433, 280/438.1, 149.2
See application file for complete search history.

(56) References Cited

U.S. PATENT DOCUMENTS

| D289,360 | S | 4/1987 | Westcott |
|---|---|---|---|
| 4,944,522 | A | 7/1990 | Hart |
| D311,482 | S * | 10/1990 | Morton .................. D8/51 |
| 5,065,488 | A | 11/1991 | Chapman et al. |
| 5,199,732 | A | 4/1993 | Lands et al. |
| 5,326,144 | A | 7/1994 | Forcier |
| 5,449,190 | A | 9/1995 | Ford |
| 5,564,725 | A | 10/1996 | Brazeal |
| 5,678,834 | A | 10/1997 | Wise |
| 5,833,253 | A | 11/1998 | Hess |
| 6,279,932 | B1 * | 8/2001 | White et al. ............ 280/149.2 |
| 6,322,091 | B1 * | 11/2001 | Lindley .................. 280/149.2 |
| 6,354,642 | B1 | 3/2002 | Haggerty |
| 7,325,822 | B1 * | 2/2008 | Humphreys et al. ...... 280/149.2 |

* cited by examiner

*Primary Examiner*—Dean J Kramer
(74) *Attorney, Agent, or Firm*—P. Jeff Martin of the McGougan Law Firm, LLC

(57) ABSTRACT

A tandem axle trailer pin extracter apparatus is provided. The extracter apparatus is adapted and configured for extracting or pulling the tandem lock pin release handle when it is desired to adjust the position of a tractor trailer body relative to the tandem axles. The extracter apparatus allows for one-person application.

16 Claims, 4 Drawing Sheets

TANDEM AXLE TRAILER PIN EXTRACTER APPARATUS

RELATED APPLICATIONS

The present invention was first described in Disclosure Document Request mailed for deposit on Oct. 31, 2006 under 35 U.S.C. §122, 37 C.F.R. §1.14, and MPEP §1706. It is respectfully requested that said Disclosure Document remain a permanent part of the file history of the present application and be relied upon during the pending prosecution, and for any other matters that may arise concerning said present application and the subject matter contained therein. There are no previously filed, nor currently any co-pending applications, anywhere in the world.

BACKGROUND OF THE INVENTION

1. Field of the Invention

The present invention relates generally to tools and equipment used in the trucking industry and, more particularly, to a tandem axle trailer pin extracter apparatus.

2. Description of the Related Art

Truck semi-trailers are equipped with longitudinally-adjustable, tandem axle frame assemblies which slide in order to better distribute a load over the wheels or to support the rear of the trailer during loading. Generally, the tandem axle frame assemblies are secured to the subframe of the trailer by a series of heavy spring-loaded pins. The pins are spring-urged in such a manner whereby pins attempt to seat themselves within holes in a locking position in the subframe and tandem axle frame. A tandem lock pin release handle which extends outward of the frame is provided in order to facilitate extraction or withdrawal of the pins from the holes for tandem axle frame adjustment. When the release handle is pulled, a pulling force is exerted, thereby facilitating extraction of the pins so as to allow the tandem axle subframe to be repositioned and the pins allowed to seek appropriate holes to establish a new location of the trailer relative to the tandem axles. However, often times the immensity of the masses involved with the trailer and the tandem axles and the forces therebetween causes the pins to be lodged in the locking position. Thus, because the operator is incapable of applying sufficient force to extract the jammed pins, he is required to return to his cab and slightly rock the semi-truck trailer back and forth in an attempt to dislodge the pins. Operator then re-attempts to pull the release handle in order to facilitate pin withdrawal. Alternatively, operator is required to seek the help of an assistant who pulls the release handle while operator slightly rocks semi-truck trailer back and forth.

Accordingly, a need has arisen for a portable apparatus adapted for one-person application, and which is further adapted for being removably securable to a tractor trailer in order to extract or pull the tandem lock pin release handle in a manner which is quick, easy, and efficient. The development of the tandem axle trailer pin extracter apparatus fulfills this need.

A search of the prior art did not disclose any patents that read directly on the claims of the instant invention; however, the following references were considered related.

The following patents disclose various tandem axle pin puller devices:

U.S. Pat. No. 5,678,834, issued in the name of Wise;
U.S. Pat. No. 5,449,190, issued in the name of Ford;
U.S. Pat. No. 5,065,488, issued in the name of Chapman et al.;
U.S. Pat. No. 6,354,642 B1, issued in the name of Haggerty;
U.S. Pat. No. 5,326,144, issued in the name of Forcier, and
U.S. Patent no. Des. 289,360, issued in the name of Westcott.

The following patents disclose various pneumatically powered pin retractors for semi-trailer tandems:

U.S. Pat. No. 4,944,522, issued in the name of Hart;
U.S. Pat. No. 5,199,732, issued in the name of Lands et al.;
U.S. Pat. No. 5,564,725, issued in the name of Brazeal; and
U.S. Pat. No. 5,833,253, issued in the name of Hess.

Internet publication advertisement featuring a tandem pin puller device provided at www.ecpulltool.com.

Consequently, a need has been felt for a portable apparatus adapted for one-person application, and which is further adapted for being removably securable to a tractor trailer in order to extract or pull the tandem lock pin release handle H in a manner which is quick, easy, and efficient.

SUMMARY OF THE INVENTION

Therefore, it is an object of the present invention to provide a portable, tandem axle trailer pin extracter apparatus adapted for one-person application.

It is another object of the present invention to provide a portable apparatus adapted for being removably securable to a tractor trailer in order to extract or pull the tandem lock pin release handle in a manner which is quick, easy, and efficient.

It is another object of the present invention to provide an elongated tubular shield for housing a tension means.

It is another object of the present invention to provide a cap adapted to enclose the anterior end of the tubular shield.

It is another object of the present invention to provide an engagement means adapted for temporarily and removably securing the tension means to a tandem lock pin release handle.

It is another object of the present invention to provide a longitudinally-adjustable brace adapted to be engaged against a tractor trailer body in order to exert a fixed tensile pulling force on the tandem lock pin release handle.

It is still another object of the present invention to provide an engagement means adapted to prevent accidental damage to the present invention should the brace dislodge during the release handle extraction procedure.

Briefly described according to one embodiment of the present invention, a tandem axle trailer pin extracter apparatus is disclosed. The extracter apparatus is adapted for extracting or pulling the tandem lock pin release handle when it is desired to adjust the position of a tractor trailer body relative to the tandem axles thereof in order to more property distribute a load contained in or intended to be contained in the trailer.

The extracter apparatus comprises an elongated tubular guard which includes a series of holes defined through an upper sidewall thereof. The tubular guard is adapted to house a tension means.

The tension means resides inside the tubular guard in such a manner that the lower end of tension means projects through an opening of tubular guard provided at the attachment end or posterior end thereof. The lower end of tension means includes an engagement means adapted for temporarily and removably securing the extracter apparatus to a tandem lock pin release handle.

A cap is disclosed, wherein cap is adapted to enclose the anterior end of tubular guard and is removably secured thereto. The cap is removably secured to the anterior end of tubular guard via a locking pin. The locking pin also functions to anchor the upper end of tension means at the anterior end of tubular guard.

A brace is disclosed, wherein brace provides a means for locking a desired tensile force on the tandem lock pin release handle into place. The brace is passed around the tubular guard, around which brace is adjustably secured. The brace is longitudinally-adjustable and securable about the external, circumferential surface of tubular guard. The brace includes an abutment member mounted vertically atop the upper surface thereof. The abutment member is adapted to be engaged against the tractor trailer body after engagement means has been secured to tandem lock pin release handle so as to exert a fixed tensile pulling force on the release handle. The abutment member is enveloped with a protective covering adapted to protect the outer finish of the tractor trailer.

The use of the present invention allows for tandem axle lock pins to be extracted by a single person in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
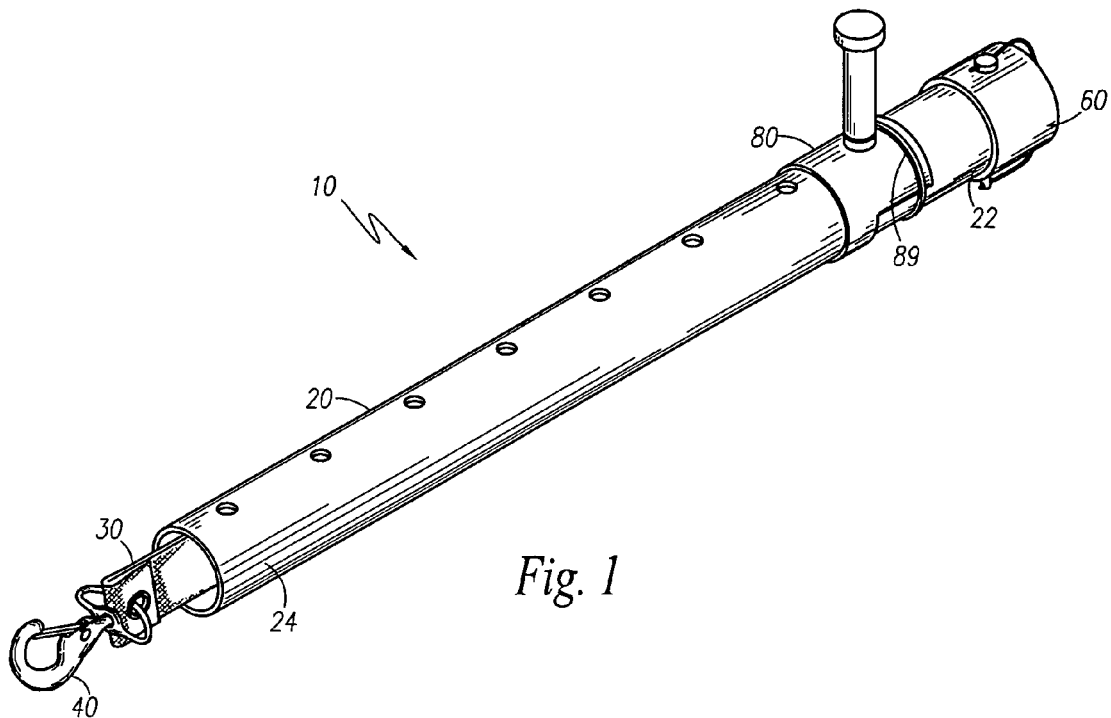
FIG. 1 is a perspective view of a tandem axle trailer pin extracter apparatus, according to the preferred embodiment of the present invention.

Referring now to FIGS. 1-10, and 12, a tandem axle trailer pin extracter apparatus 10, hereinafter extracter apparatus 10, according to the present invention, is provided for extracting or pulling the tandem lock pin release handle H when it is desired to adjust the position of a tractor trailer body T relative to the tandem axles thereof in order to more properly distribute a load contained in or intended to be contained in the trailer T. The extracter apparatus 10 comprises an elongated tubular guard 20 having an anterior end 22 defining an opening 28, which anterior end 22 opposes a posterior end 24 defining an opening 29. The tubular guard 20 is fabricated of a lightweight, rigid material. The tubular guard 20 includes a plurality of holes 25 defined through an upper, external circumferential sidewall thereof, wherein holes 25 are spatially aligned in a linear orientation, which holes 25 are discussed later in greater detail. The tubular guard 20 is adapted to house a tension means 30.

The tension means 30 is preferably at least one bungee strap or cord 32 fabricated of rubber, however, other tension means 30 are envisioned which include a tension spring (not shown). The tension means 30 includes an upper end 33 and a lower end 34, wherein upper end 33 and lower end 34 each includes an aperture 35 and 36, respectively, defined therethrough. The tension means 30 resides inside tubular guard 20, wherein the lower end 34 of tension means 30 projects through the opening 29 provided at the attachment end or posterior end 24 of tubular guard 20. The lower end 34 of tension means 30 includes an engagement means 40 adapted for temporarily and removably securing the extracter apparatus 10 to the tandem lock pin release handle H. The engagement means 40 is mounted to the lower end 34 of tension means 30. The engagement means 40 is defined as a safety clamp 42 having a dog 44 secured through aperture 36 of tension means 30. The safety clamp 42 includes a hook portion 43 and a spring-biased lever arm 46, wherein lever arm 46 is biased in a manner such that in a resting position, an upper end 47 of lever arm 46 engages the upper, inner end 45 of hook portion 43. The hook portion 43 of safety clamp 42 is adapted for temporarily and removably securing the tension means 30 to the tandem lock pin release handle H by hooking the hook portion 43 therearound.

Figure 11:
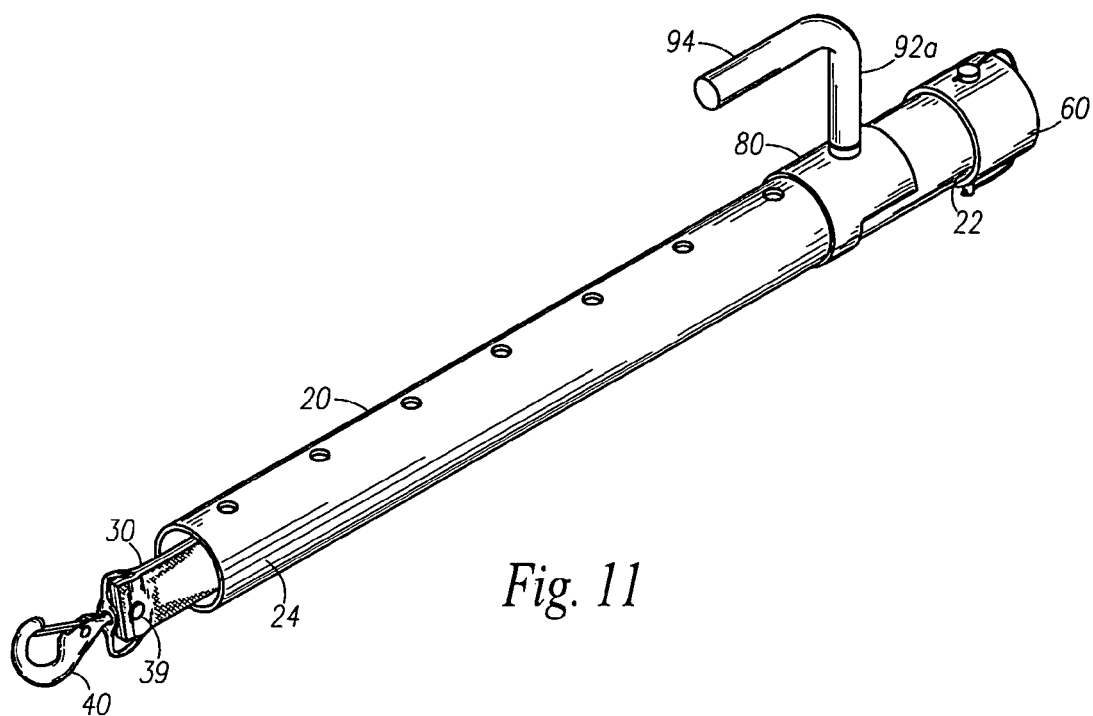
FIG. 11 is a perspective view of the present invention illustrating an alternate abutment member embodiment.
Figure 12:
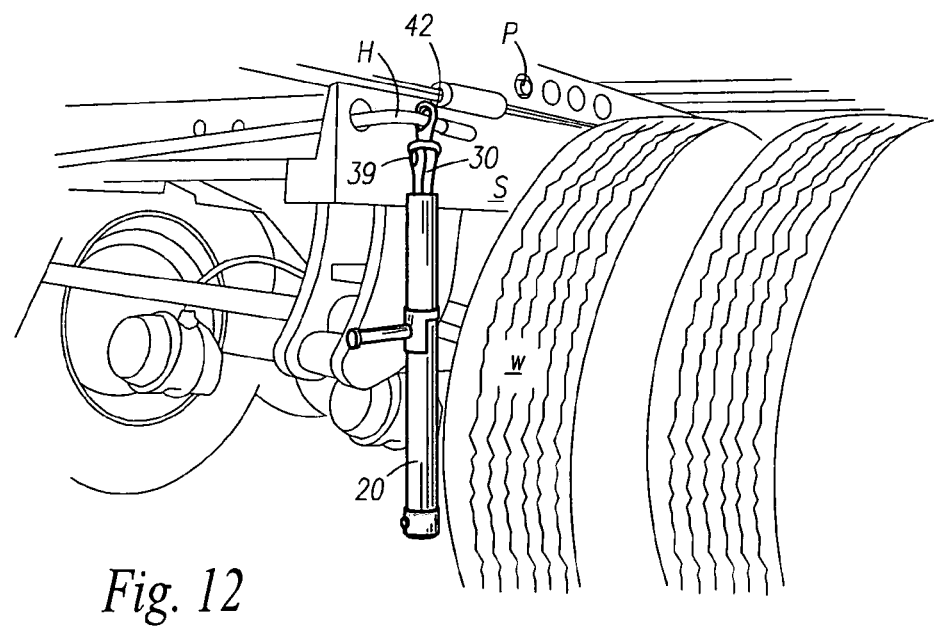
FIG. 12 is a perspective view of the present invention shown in a secured, suspended position clear of trailer wheels.

In order to increase the degree of tensile force exerted on the tandem lock pin release handle H, two tension means 30 may be utilized and adjacently housed within tubular guard 20. In the event two tension means 30 are utilized, the dog 44 of safety clamp 42 is secured to the lower end 34 of both tension means 30 via a fastener 39 inserted through the apertures 36 thereof, as shown in FIGS. 11 and 12.

Figure 2:
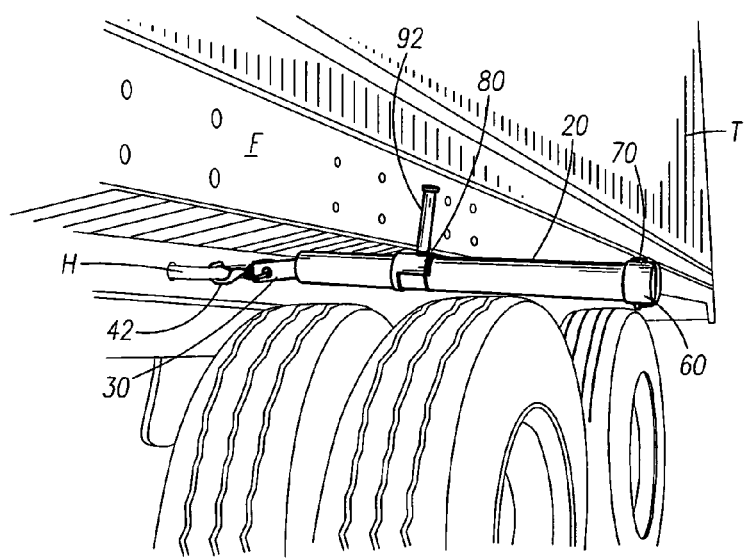
FIG. 2 is a perspective view of the present invention shown in-use, according to the preferred embodiment thereof.
Figure 3:
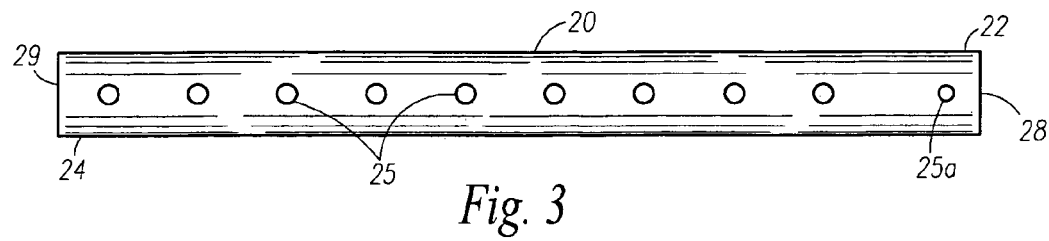
FIG. 3 is a top side elevational view of the tubular guard, according to the preferred embodiment of the present invention.
Figure 4:
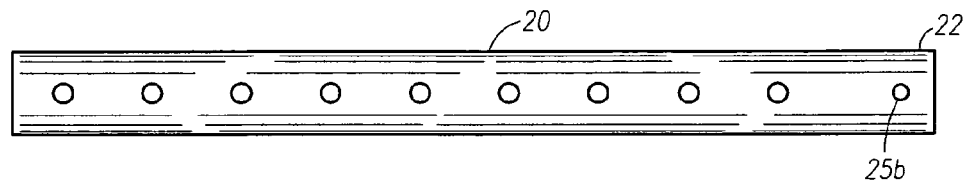
FIG. 4 is a bottom side elevational view of the tubular guard, according to the preferred embodiment of the present invention.
Figure 5:
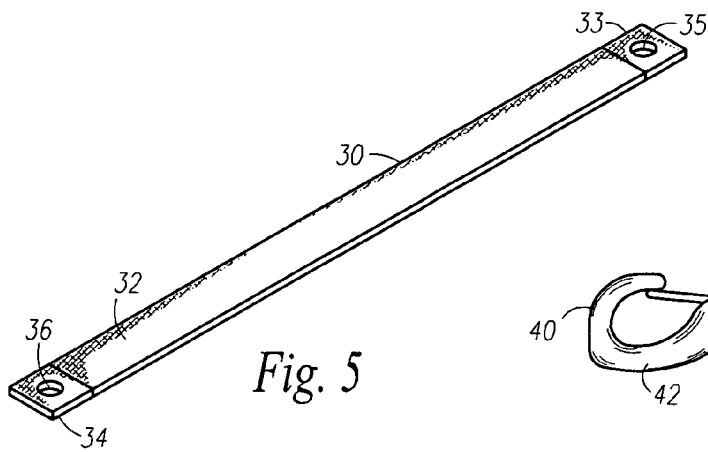
FIG. 5 is a perspective view of the tension means, according to the preferred embodiment of the present invention.
Figure 6:
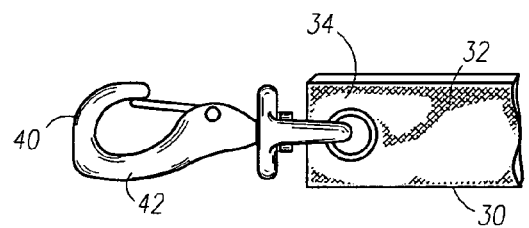
FIG. 6 is a partial perspective view of the tension means shown attached to the engagement means.
Figure 7:
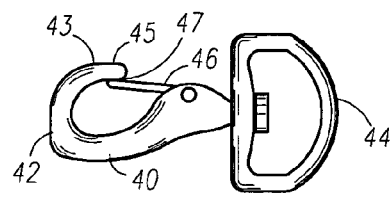
FIG. 7 is a side elevational view of the engagement means.
Figure 8:
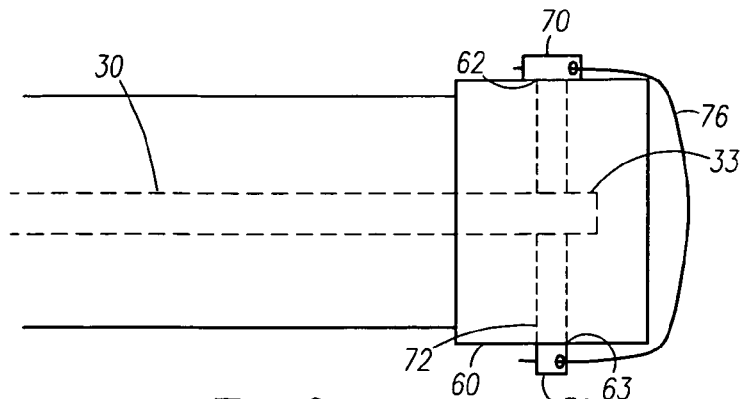
FIG. 8 is a partial side elevational view of the cap shown attached to the anterior end of the tubular guard.
Figure 9:
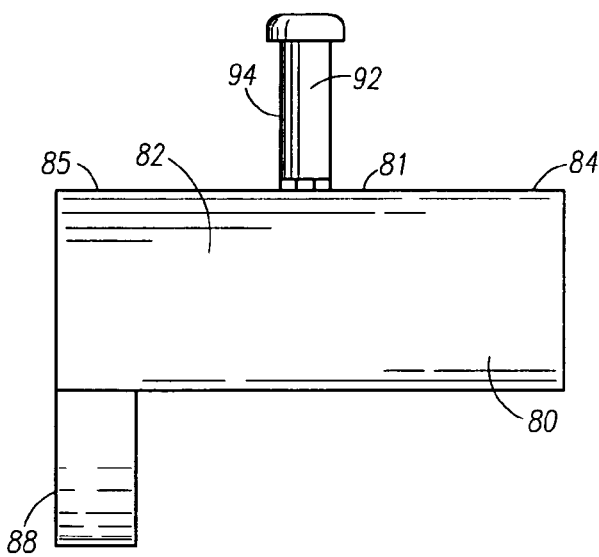
FIG. 9 is a side elevational view of the brace, according to the preferred embodiment of the present invention.
Figure 10:
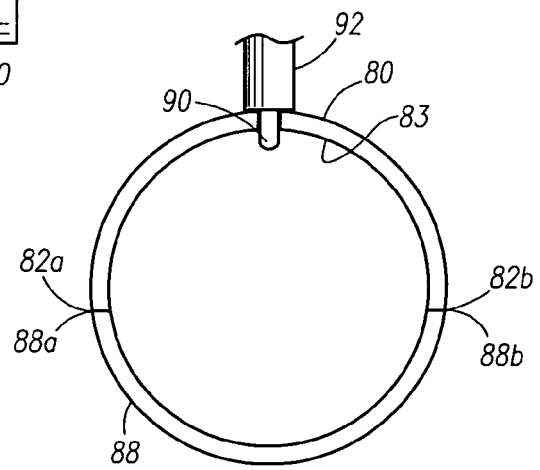
FIG. 10 is a front side elevational view of the brace, according to the preferred embodiment of the present invention.

Referring now more specifically to FIGS. 1, 2, and 8, a cap 60 is disclosed, wherein cap 60 is adapted to enclose the anterior end 22 of tubular guard 20 and is removably secured thereto. Cap 60 includes an upper hole 62 and a lower hole 63 defined through the circumferential sidewall thereof. The upper hole 62 is linearly aligned with lower hole 63. Cap 60 is removably secured to the anterior end 22 of tubular guard 20 via a locking pin 70. The locking pin 70 also functions to anchor the upper end 33 of tension means 30 at the anterior end 22 of tubular guard 20. Cap 60 is placed over anterior end 22 in such a manner that upper hole 62 and lower hole 63 of cap 60 are aligned linearly with respect to upper, foremost hole 25a of tubular guard 20 and aperture 35 of tension means 30, wherein upper, foremost hole 25a being proximal to anterior end 22 of tubular guard 20. In order to both removably secure cap 60 to anterior end 22 of tubular guard 20 and to anchor upper end 33 of tension means 30 to said anterior end 22, the stem portion 72 of locking pin 70 is inserted through upper hole 62 of cap 60, through upper, foremost hole 25a of tubular guard 20, through aperture 35 of tension means 30, through lower, foremost hole 25b of tubular guard 20, and through lower hole 63 of cap 60. The pivoting arm 76 of locking pin 70 mates with a bottom end 74 of the stem portion 72.

Referring now to FIGS. 1, 2, 9, and 10, a brace 80 is provided, wherein brace 80 provides a means for locking a desired tensile force on the tandem lock pin release handle H into place. The brace 80 is passed around the tubular guard 20, around which brace 80 is adjustably secured. More specifically, the brace 80 is longitudinally-adjustable and securable about the external, circumferential surface of tubular guard 20. Thus, brace 80 is adapted to allow for a plurality of tensile force settings, is further adapted to reciprocate longitudinally about tubular guard 20, and is lockable to a desired longitudinal, tensile force setting. The brace 80 is defined of an elongated, semi-circular body 82, wherein semi-circular body 82 has a forward end 84 opposing a rearward end 85. Brace 80 has an upper surface 81 and a lower surface 83. The brace 80 includes a boss 90 mounted to the lower surface 83 of semi-circular body 82, wherein boss 90 extends downward vertically from lower surface 83 and is mounted proximal to the forward end 84 of brace 80. The boss 90 is adapted to mate with each of the plurality of holes 25 of tubular guard 20, thereby removably-locking brace 80 into a desired longitudinal position about tubular guard 20. Thus, the position of the brace 20 relative to the tubular guard 20 is lockable by means of the boss 90.

The brace 80 includes a generally C-shaped lagging 88 constructed integral to or mounted to the bottom edges 82a, 82b of the semi-circular body 82 at the rearward end 85 thereof. More specifically, the C-shaped lagging 88 includes complementary upper edges 88a, 88b mounted to the bottom edges 82a, 82b of semi-circular body 82. The lagging 88 is adapted to fixedly support brace 80 in a selectively-desired longitudinal position about tubular guard 20. The semi-circular body 82 of brace 80 and the lagging 88 jointly provide a circular component having a diameter measuring slightly greater than a diameter of tubular guard 20, thereby allowing brace 80 to pass around tubular guard 20.

The brace 80 further includes an abutment member 92 mounted vertically atop the upper surface 81 thereof, posterior to boss 90. The abutment member 92 is defined of an elongated linear configuration and is enveloped with a protective covering 94 adapted to protect the outer finish F of the tractor trailer T. The protective covering 94 is envisioned to be constructed of a pliable material including but not limited to rubber, plastic, a flexible, pliable plastic or rubber polymer, neoprene, silicone rubber, thermosensitive siliconised polyvinyl chloride, polyurethane, polyethylene, polystyrene, or polyethylene terephthalate.

It is envisioned that abutment member 92 may be provided in alternative configurations or shapes, such as a L-shaped abutment member 92a shown in FIG. 11. Like the preferred abutment member 92, the alternatively designed abutment member(s) 92a is enveloped with a protective covering 94 adapted to protect the outer finish F of the tractor trailer T.

During periods of non-use, the brace 80 is held in a fixed position around tubular guard 20 via an elastic, annular flange 89. The flange 89 is passed around the upper surface 81 of brace 80 and a lower surface of tubular guard 20, thereby temporarily removably affixing brace 80 to tubular guard 20.

Referring now to FIGS. 2 and 12, in the event user is required to adjust the position of a tractor trailer body T relative to the tandem axles, the hook portion 43 of safety clamp 42 is hooked to the tandem lock pin release handle H. The tubular guard 20 is pulled outwardly by user in order to exert a tensile pulling force on the release handle H by means of the tension means 30. Upon reaching a desired pulling or tensile force for the tension means 30, brace 80 is slidably adjusted, longitudinally about tubular guard 20 and boss 90 of brace 80 is inserted inside a selectively-desired hole 25. Abutment member 92 is engaged against the tractor trailer body T. The protective covering 94 of abutment member 92 protects the outer finish F of the tractor trailer T against scratches, paint removal, and similar damage. In the event shear pressure remains on the tandem unit lock pins P, user returns to the cab of the truck tractor (not shown) and moves the truck and tractor trailer T slightly to release any shear pressure on the tandem unit lock pins P, with the tension of the tension means 30 simultaneously on the tandem lock pin release handle H. Once locking pins P have been released, user may be required, perhaps several times, to move the truck tractor and tractor trailer T relative to the tandem axle assembly in order to reposition the tractor trailer T relative to the tandem unit as desired.

Should the abutment member 92 of brace 80 dislodge during the release handle H extraction procedure, the safety clamp 42 ensures secured connection by extracter apparatus 10 to tandem lock pin release handle H, thus causing extracter apparatus 10 to drop downwardly to rest adjacent the tandem axle subframe S in a suspended manner and clear of trailer wheels W. Accordingly, the safety clamp 42 also prevents accidental damage to extracter apparatus 10 caused by rollover contact with trailer wheels W.

The degree of locked tensile force exerted on the release handle H is adjustable. The plurality of holes 25 provided in tubular guard 20 allow for a plurality of locked, tensile force settings. A greater locked tensile force is exerted against the tandem lock pin release handle H by sliding and locking brace 80 proximal to the posterior end 24 of tubular guard 20 and engaging abutment member 92 against the tractor trailer body T. On the contrary, a lesser locked tensile force is exerted against the tandem lock pin release handle H by sliding and locking brace 80 proximal to the anterior end 22 of tubular guard 20 and engaging abutment member 92 against the tractor trailer body T. Thus, the plurality of holes 25 allow for incrementally-adjustable locked tensile force.

2. Operation of the Preferred Embodiment

To extract the tandem lock pins P from the holes of the tandem axle frame in order to adjust the position of a tractor trailer body T relative to the tandem axles, user hooks the hook portion 43 of safety clamp 42 to the tandem lock pin release handle H. User then pulls the tubular guard 20 outwardly in order to exert a tensile pulling force on the release handle H by means of the tension means 30. Upon reaching a desired pulling or tensile force for the tension means 30, user slidably adjusts the brace 80 longitudinally about tubular guard 20, and inserts the boss 90 of brace 80 inside a selectively-desired hole 25 of tubular guard 20. Next, user engages the abutment member 92 against the tractor trailer body T. The protective covering 94 of abutment member 92 protects the outer finish F of the tractor trailer T against scratches, paint removal, and similar damage. In the event shear pressure remains on the tandem unit lock pins P, user returns to the cab of the truck tractor and moves the truck and tractor trailer T slightly to release any shear pressure on the tandem unit lock pins P, with the tension of the tension means 30 simultaneously on the tandem lock pin release handle H. Once locking pins P have been released, user may be required, perhaps several times, to move the truck tractor and tractor trailer T relative to the tandem axle assembly in order to reposition the tractor trailer T relative to the tandem unit as desired.

The use of the present invention allows for tandem axle lock pins to be extracted by a single person in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A tandem axle trailer pin extracter apparatus comprising:
   an elongated tubular guard, said tubular guard having an anterior end opposing a posterior end;
   a tension means, said tension means is housed inside said tubular guard, said tension means has an upper end anchored to said tubular guard at said anterior end of said tubular guard;
   an engagement means, said engagement means is mounted to a lower end of said tension means, said engagement means is adapted for temporarily and removably securing the tandem axle trailer pin extracter apparatus to a tandem lock pin release handle;
   a cap, said cap is removably secured to said anterior end of said tubular guard; and
   a brace, said brace is longitudinally-adjustable and securable about an external, circumferential surface of said tubular guard, wherein said tubular guard includes a plurality of holes defined through an upper, external circumferential sidewall thereof, said holes are spatially aligned in a linear orientation, wherein said tension means is defined of at least one bungee strap or cord, wherein said lower end of said tension means projects through an opening provided at said posterior end of said tubular guard.

2. The tandem axle trailer pin extracter apparatus of claim 1, wherein said engagement means is defined as a safety clamp having a dog secured through an aperture provided at said lower end of said tension means.

3. The tandem axle trailer pin extracter apparatus of claim 2, wherein said safety clamp includes a hook portion and a spring-biased lever arm, wherein said lever arm is biased in a manner such that in a resting position, an upper end of said lever arm engages an upper, inner end of said hook portion, said hook portion is adapted for temporarily and removably securing said tension means to the tandem lock pin release handle.

4. The tandem axle trailer pin extracter apparatus of claim 1, wherein said engagement means is defined as a safety clamp having a dog secured to a lower end of each of a pair of tension means via a fastener inserted through an aperture provided at said lower end of each said pair of tension means.

5. The tandem axle trailer pin extracter apparatus of claim 1, wherein said cap is removably secured to said anterior end of said tubular guard via a locking pin.

6. The tandem axle trailer pin extracter apparatus of claim 5, wherein said locking pin is adapted to anchor said upper end of said tension means at said anterior end of said tubular guard.

7. The tandem axle trailer pin extracter apparatus of claim 1, wherein said brace is defined of an elongated, semi-circular body, said semi-circular body has a forward end opposing a rearward end, and wherein said semi-circular body has an upper surface and a lower surface.

8. The tandem axle trailer pin extracter apparatus of claim 7, wherein said brace includes a boss mounted to said lower surface of said semi-circular body, said boss extends downward vertically from said lower surface of said semi-circular body and is mounted proximal to said forward end of said semi-circular body.

9. The tandem axle trailer pin extracter apparatus of claim 8, wherein said boss is adapted to mate with each of a plurality of holes of said tubular guard, thereby removably-locking said brace into a desired longitudinal position about said tubular guard.

10. The tandem axle trailer pin extracter apparatus of claim 8, wherein said brace includes an abutment member mounted atop said upper surface thereof, posterior to said boss of said brace.

11. The tandem axle trailer pin extracter apparatus of claim 10, wherein said abutment member is mounted vertically atop said upper surface of said brace, posterior to said boss of said brace, and wherein said abutment member is defined of an elongated linear configuration, said abutment member is adapted for engagement against a tractor trailer body, said abutment member is enveloped with a protective covering adapted to protect an outer finish of the tractor trailer body.

12. The tandem axle trailer pin extracter apparatus of claim 7, wherein said brace includes a generally C-shaped lagging constructed integral to or mounted to bottom edges of said semi-circular body at said rearward end thereof.

13. The tandem axle trailer pin extracter apparatus of claim 12, wherein said C-shaped lagging includes complementary upper edges mounted to said bottom edges of said semi-circular body.

14. The tandem axle trailer pin extracter apparatus of claim 12, wherein said C-shaped lagging is adapted to fixedly support said brace in a selectively-desired longitudinal position about said tubular guard.

15. The tandem axle trailer pin extracter apparatus of claim 12, wherein said semi-circular body of said brace and said C-shaped lagging jointly provide a circular component having a diameter measuring slightly greater than a diameter of said tubular guard, thereby allowing said brace to pass around said tubular guard.

16. The tandem axle trailer pin extracter apparatus of claim 1, further comprising an elastic, annular flange, said flange is passed around an upper surface of said brace and a lower surface of said tubular guard, said flange is adapted to temporarily hold said brace in a fixed position around said tubular guard during periods of non-use.

* * * * *